United States Patent
Hashimoto

(10) Patent No.: US 7,405,883 B2
(45) Date of Patent: Jul. 29, 2008

(54) OPTICAL COMPONENT AND METHOD OF MANUFACTURE OF OPTICAL COMPONENT

(75) Inventor: Tomohiro Hashimoto, Sagamihara (JP)

(73) Assignee: Ohara Inc., Sagamihara-Shi (JP)

( * ) Notice: Subject to any disclaimer, the term of this patent is extended or adjusted under 35 U.S.C. 154(b) by 0 days.

(21) Appl. No.: 11/288,102

(22) Filed: Nov. 29, 2005

(65) Prior Publication Data

US 2006/0119956 A1    Jun. 8, 2006

(30) Foreign Application Priority Data

Dec. 3, 2004   (JP)   ............... 2004-351632

(51) Int. Cl.
G02B 9/00    (2006.01)
G02B 27/44   (2006.01)
G02B 6/02    (2006.01)
G02F 1/01    (2006.01)

(52) U.S. Cl. ............ 359/652; 359/565; 359/569; 359/599; 385/124; 385/126; 385/129; 250/225

(58) Field of Classification Search ........... 359/619, 359/652, 837, 707, 708, 569, 599, 562, 565; 351/161, 163, 169, 171, 173, 179; 348/342, 348/335; 430/4, 1, 18, 290, 321; 385/31, 385/901, 11, 33, 123–126, 132, 14, 37, 129, 385/130, 140–142, 144, 147; 65/38, 155, 65/156, 403, 385, 386, 390, 392; 250/225, 250/368; 257/79, 81, 84; 372/20, 21, 50.1
See application file for complete search history.

(56) References Cited

U.S. PATENT DOCUMENTS 2,959,105 A * 11/1960 Sayanagi ............... 430/4
3,455,666 A *  7/1969 Bazinet, Jr. ............ 65/403
3,485,556 A * 12/1969 Naujokas ............... 351/169
4,919,504 A *  4/1990 Colas et al. ............ 385/130
5,120,120 A *  6/1992 Cohen ................... 351/161

(Continued)

FOREIGN PATENT DOCUMENTS

EP    1162519    12/2001

(Continued)

OTHER PUBLICATIONS

Li et al; "Holographic fabrication of multiple layers of grating inside soda-lime glass with femtosecond laser pulses;" Applied Physics Letters; vol. 80, No. 9 (Mar. 4, 2002) pp. 1508-1510.

(Continued)

Primary Examiner—Loha Ben
(74) Attorney, Agent, or Firm—Kratz, Quintos & Hanson, LLP.

(57) ABSTRACT

An optical component or optical low-pass filter has two or more regions demarcated by differences in refractive indexes, in which a region having a refractive index different from the refractive index of the continuous region with the largest volume among the two or more regions is formed in the interior of a transparent material. This optical component or optical low-pass filter has regions with different refractive indexes formed in the interior by pulsed laser irradiation or focused irradiation of the transparent material.

51 Claims, 8 Drawing Sheets

U.S. PATENT DOCUMENTS

| | | | |
|---|---|---|---|
| 5,438,366 A * | 8/1995 | Jackson et al. | 348/342 |
| 5,555,129 A * | 9/1996 | Konno et al. | 359/569 |
| 5,995,279 A * | 11/1999 | Ogino et al. | 359/355 |
| 6,358,653 B1 * | 3/2002 | Turberfield et al. | 430/18 |
| 6,796,148 B1 * | 9/2004 | Borrelli et al. | 65/386 |
| 6,936,854 B2 * | 8/2005 | Iwasaki et al. | 257/81 |
| 6,937,399 B2 * | 8/2005 | Takahashi et al. | 359/599 |
| 6,945,078 B2 * | 9/2005 | Fukuda et al. | 65/386 |
| 7,057,816 B1 * | 6/2006 | Allen et al. | 359/494 |
| 7,088,747 B2 * | 8/2006 | Takiguchi et al. | 372/20 |
| 7,123,804 B2 * | 10/2006 | Baba et al. | 385/129 |
| 7,310,463 B2 * | 12/2007 | Shimotsuma et al. | 385/37 |
| 2004/0124343 A1 * | 7/2004 | Shimotsuma et al. | 250/225 |
| 2005/0244123 A1 * | 11/2005 | Hirao et al. | 385/129 |
| 2006/0215976 A1 * | 9/2006 | Singh et al. | 385/126 |

FOREIGN PATENT DOCUMENTS

| | | |
|---|---|---|
| EP | 1193512 | 4/2002 |
| JP | 61-149923 | 7/1986 |
| JP | 6-242404 | 9/1994 |
| JP | 6-308430 | 11/1994 |
| JP | 7-5395 | 1/1995 |
| JP | 08-201729 | 8/1996 |
| JP | 11-038315 | 2/1997 |
| JP | 9-311237 | 12/1997 |
| JP | 2000-56112 | 2/2000 |
| JP | 2003-506731 | 2/2003 |
| JP | 2004-196585 | 7/2004 |
| WO | WO 99/35529 | 7/1999 |
| WO | WO 01/14937 | 3/2001 |
| WO | WO 02/16969 | 2/2002 |
| WO | WO 02/27377 | 4/2002 |
| WO | WO 02/31543 | 4/2002 |

OTHER PUBLICATIONS

European Search Report dated Jul. 13, 2006.
W. Watanabe, et al., "Fabrication of Fresnel Zone Plate Embedded in Silica Glass by Femtosecond Laser Pulses;" Optics Express; vol. 10, No. 19, pp. 978-983, Sep. 2002.
K. Yamada, et al; "Multilevel Phase-Type Diffractive Lenses in Silica Glass Induced by Filamentation of Femtosecond Laser Pulses;" Optics Letters, vol. 29, No. 16; pp. 1846-1848; Aug. 2004.

* cited by examiner

SPATIAL FREQUENCY (LINES/mm)

OPTICAL COMPONENT AND METHOD OF MANUFACTURE OF OPTICAL COMPONENT

BACKGROUND OF THE INVENTION

Priority is claimed on Japanese Patent Application No. 2004-351632, filed Dec. 3, 2004, the content of which is incorporated herein by reference.

1. Field of the Invention

This invention relates to an optical component manufactured using pulsed laser beam, and in particular pulsed laser beam the time duration of which is $10^{-12}$ second or less, such as femtosecond ($10^{-15}$ second) pulses, and in particular relates to an optical low-pass filter suitable for solid-state image capture elements such as are used in video cameras, digital still cameras, fiberscopes and similar, as well as a manufacturing method for same. Such components are also suitable for use as optical low-pass filters in liquid crystal, plasma, EL, SED and other displays, and other dot-matrix display devices.

2. Description of Related Art

The spread of digital video cameras and digital still cameras in recent years has been accompanied by progress toward greater compactness of optical systems and higher pixel densities.

The digital video cameras and digital still cameras have solid-state image capture elements with pixels arranged in a discontinuous but regular array. Through spatial optical sampling of the object image, an image capture output is obtained corresponding to each of the pixels of the object image.

In a solid-state image capture element which thus optically samples the object image, the fineness of patterns which can be handled is determined in relation to the sampling frequency; if spatial frequency components at frequencies higher than the Nyquist frequency (hereafter called the "cut-off frequency"), which is one-half the sampling frequency, are included in the object image, then spurious signals due to aliasing artifacts may occur, so that, for example, in a color video camera, colors unrelated to the colors of the object may appear as such spurious signals in the reproduced images. Hence in devices having such solid-state image capture elements, optical low-pass filters which limit the object high spatial frequency components are positioned in the image capture optical system, to prevent the occurrence of spurious signals due to aliasing artifacts.

As such optical low-pass filters, conventional filters are widely known which utilize the birefringence of quartz to maintain contrast as high as possible with respect to lower spatial frequency components than the cutoff frequency.

Also in the prior art, focusing on the fact that the autocorrelation function of the pupil function of a focusing optical system provides the transfer function for the system (the absolute value of which is hereafter abbreviated "MTF"), a phase-type optical low-pass filter has been proposed in which the pupil function is intentionally provided with aberration to obtain the target optical characteristics. That is, the MTF represents the contrast with the spatial frequency, and so by inserting into the optical system an optical component which provides an MTF characteristic such that the contrast in the high spatial frequency region, above the cutoff frequency determined by the pixel aperture width and pitch, is made low, spurious-signal images due to aliasing are made less prominent.

As such a phase-type optical low-pass filter has, for example, a component which is a transparent substrate of glass, resin or similar, with a stripe-shape periodic structure formed on the surface thereof and is inserted into an optical system. Differences between the optical distances of transmitted light, that is, phase differences, are imparted by the stripe-shape periodic structure, changing the phase terms of the pupil function, to realize optical low-pass filter characteristics.

Various methods have been disclosed relating to the method of fabrication of such a phase-type optical low-pass filter. For example, a lithography method which uses semiconductor fabrication techniques is known. Here, a photosensitive resin film applied to the glass or other substrate is subjected to mask exposure using a photomask or to interference exposure, followed by development, to fabricate a photosensitive film pattern on the glass. Then, by performing dry etching treatment from above, a pattern is simultaneously etched in the glass exposed at the surface and in the photosensitive film; when at last the photosensitive film is consumed, depressions have been formed by etching in the glass surface, and the overall result is formation of a diffraction grating consisting of the glass substrate.

In addition, a method in which a pattern is created in metal or a single crystal by the above means, and this is used as a die in hot pressing and injection molding to transfer a pattern, as well as a method in which a photosetting resin is poured into such a die, and the resin is hardened into the shape of the die through irradiation with ultraviolet rays or similar, are also known (see Japanese Unexamined Patent Application, First Publication No. 6-308430).

In Japanese Unexamined Patent Application, First Publication Nos. 6-242404 and 7-5395, a method is disclosed in which a diamond wheel is used in grinding to cut a stripe structure with regular protrusions and depressions on a substrate surface.

In Japanese Unexamined Patent Application, First Publication No. 61-149923, a method is disclosed in which an ion-exchange method or similar is employed to form portions on a glass surface with different refractive indexes, to fabricate a phase-type diffraction grating.

On the other hand, advances in laser pulse compression technology in recent years have been accompanied by numerous reports on the fabrication of transparent materials using ultra-short-pulse laser light. In particular, the high peak power of laser light with pulse duration of femtosecond order are known to have made possible three-dimensional fabrication of the interior of transparent materials, utilizing multi-photon absorption processes. In Japanese Unexamined Patent Application, First Publication No. 9-311237, a method is disclosed in which laser light irradiation is used to form a high-refractive index region within glass, to form a three-dimensional optical waveguide. Further, Japanese Unexamined Patent Application, First Publication No. 2000-56112 discloses a method of using laser light irradiation to induce a permanent three-dimensional distribution of the refractive index within glass material, to create an optical diffraction element.

With respect to irradiation methods for femtosecond laser light, a fabrication method is known in which the pulse beam is focused by a lens and the focal point is scanned (in addition to the above, see Published Japanese Translation No. 2003-506731 of PCT International Publication), and in Japanese Unexamined Patent Application, First Publication No. 2004-196585, a method is disclosed in which a refractive index-modified area, with a two-dimensional or three-dimensional shape, is formed at once within glass or some other transparent material, using a laser beam without a scanning mechanism.

An optical low-pass filter which employs the birefringence of quartz incurs the expensive raw material costs of the quartz, and in particular requires a plurality of sheets of quartz and becomes thick when contemplating use in a color video camera using a solid-state image capture element, so that there are limits placed on the compactness of the optical system. Moreover, problems of precise optical axis alignment, and of strain when bonding sheets together, as well as numerous other problems related to manufacture make such components unsuitable for mass production.

On the other hand, conventional optical low-pass filters employing phase-type diffraction gratings, obtained by fabrication the surface of a material, have the following problems from the standpoint of device manufacture.

For example, when using lithography, there are numerous processes as explained above, and the time required leads to increased fabrication costs. On the other hand, when an attempt is made to for example fabricate a rectangular-shape grating with large step height differences, in consideration of the ease of fabrication, it is not easy to machine grooves which are deep in the vertical direction. Further, it may be necessary to select optimal environment conditions for dry etching depending on the material, and in other respects also control is complicating, and there is little degree of freedom in choice of materials. In addition, due to the nature of the fabrication method, fabrication of the surface is limited to two dimensions, so that there is little degree of freedom in the design of the structure.

On the other hand, when using a mold fabricated using lithography, mass production is improved compared with cases in which lithography is used to directly machine a substrate, and so there is the advantage that costs can be kept low. However, limitations are imposed on the selection of materials. That is, in the case of a hot-pressed replica, the material for fabrication is limited to glass and resin. In the case of the photopolymer method described in Japanese Unexamined Patent Application, First Publication No. 6-308430 also, the material is limited to a photosensitive resin. Further, in the case of a hot-pressed replica, when choosing the mold and material for fabrication, the durability of the mold with respect to the softening temperature of the glass is an issue; and conversely, the material should be preferably selected with this born in mind.

When cutting using a diamond wheel, mass production properties are poor compared with molding of glass or resin using a mold, and there are problems with fabrication multiple-angled or curving filter patterns. Accordingly, there is little degree of freedom in choosing shapes at the design stage, and shape precision is poor. Moreover, the mechanical strength of the material becomes an issue, so that there is little degree of freedom in choice of material as well.

Methods in which ion exchange techniques or similar are used to form portions on a glass surface the refractive index of which differs are in essence material surface fabrication methods, and so there is little degree of freedom of pattern design. In the case of ion exchange methods, a metal mask or similar must be formed by the above-described photolithography in order to obtain the desired pattern. This is performed by immersion in a fused-salt reactor, and the processes involved are complex.

On the other hand, with respect to internal fabrication using the above ultra-short pulse laser light, the above-mentioned Japanese Unexamined Patent Application, First Publication No. 2004-196585 describes a number of examples of optical components for optical communication, fabricated by forming regions in which the refractive index changes according to three-dimensional shapes. Further, the above-mentioned Japanese Unexamined Patent Application, First Publication No. 2000-56112 describes a method of fabrication of a three-dimensional volume-type diffraction grating, with applications as a Bragg diffraction grating employing regions in which the refractive index changes in layers. However, in none of these disclosures are applications to optical components which control the phase of light transmitted therethrough, and in particular to optical low-pass filters, discussed.

SUMMARY OF THE INVENTION

An object of this invention is to provide an optical component or optical low-pass filter which can be easily manufactured, and which, from the standpoint of material selection, structure or similar, enables a high degree of freedom of design.

The inventor of the present invention focused on the fact that phase control of light is possible by utilizing refractive index-change regions arising from heterogeneous phases formed in two dimensions or in three dimensions within transparent material by pulsed laser beam, and discovered the possibility of application to optical components which control the phase of transmitted light rays, and in particular the fact that such components are suitable as optical low-pass filters.

That is, if the material is transparent at the fabrication wavelength using this fabrication method, then three-dimensional fabrication in the interior of the material is possible through multi-photo absorption processes, so that even in the case of complex pattern designs which would be difficult to machine using conventional methods, machine is easy through modifications to the irradiating optical system. By reducing the number of fabrication processes and shortening the fabrication time, costs incurred in the manufacturing stage can be lowered. Moreover, it was discovered that when for example the component is incorporated into a solid-state image capture element, a material having the required optical, mechanical and thermal characteristics can be selected appropriately, thus enabling the achievement of this invention.

An optical component or optical low-pass filter of this invention has two or more regions, demarcated by the fact of different refractive indexes. Of these regions, a region having a refractive index differing from the refractive index of the continuous region with the largest volume is formed within transparent material.

In this specification, "two or more regions demarcated by the fact of different refractive indexes" refers to two or more regions demarcated by their refractive indexes when a certain value of the refractive index is regarded as a threshold value. Hence within one demarcated region, the refractive index does not necessarily have a constant value. When the transparent material already has a refractive index distribution prior to irradiation with pulsed laser beam, a plurality of values may be set for refractive index thresholds, according to the position in the transparent material.

In an optical component or optical low-pass filter of this invention, the regions having different refractive indexes may, in the same continuous region, have a shape which changes periodically.

In an optical component or optical low-pass filter of this invention, the regions having different refractive indexes may be formed in a plurality of discontinuous regions, and these plurality of formed regions may be arranged periodically in two or in three dimensions.

In an optical component or optical low-pass filter of this invention, the regions having different refractive indexes may, in the same continuous region, have a shape which changes periodically, and the periodic shape change may be a periodic shape change such that, in the high spatial frequency region equal to or above the cutoff frequency, the MTF value≦0.5.

In an optical component or optical low-pass filter of this invention, the regions having different refractive indexes may be formed in a plurality of discontinuous regions, these plurality of formed regions may be arranged periodically in two or in three dimensions, and this periodic arrangement may be a periodic arrangement such that, in the high spatial frequency region equal to or above the cutoff frequency, the MTF value ≦0.5.

In an optical component or optical low-pass filter of this invention, the regions having different refractive indexes may, in the same continuous region, have a shape which changes periodically, and the periodic shape change may be a periodic shape change such that, in the high spatial frequency region equal to or above the cutoff frequency, the MTF value≦0.5, so that the optical component has the function of an optical low-pass filter.

In an optical component or optical low-pass filter of this invention, the periodic changes in shape may separate into beams light which is incident thereon, and may be periodic changes in shape such that, in the high spatial frequency region equal to or greater than the cutoff frequency, the MTF value≦0.5.

In an optical component or optical low-pass filter of this invention, the regions having different refractive indexes may be formed in a plurality of discontinuous regions, these plurality of formed regions may be arranged periodically in two or in three dimensions, and this periodic arrangement may be a periodic arrangement such that, in the high spatial frequency region equal to or above the cutoff frequency, the MTF value ≦0.5, so that the optical component has the function of an optical low-pass filter.

In an optical component or optical low-pass filter of this invention, the periodic arrangement may separate into beams light which is incident thereon, and may be a periodic arrangement such that, in the high spatial frequency region equal to or greater than the cutoff frequency, the MTF value≦0.5.

In an optical component or optical low-pass filter of this invention, regions formed within the transparent material may have refractive indexes, at wavelengths from 0.1 μm to 2 μm, which differ by 0.0001 or more from that of the region with the largest volume.

In an optical component or optical low-pass filter of this invention, the transparent material may be any among a single crystal, glass, glass ceramics, ceramics, or organic resin.

In an optical component or optical low-pass filter of this invention, it is preferable that, in cases where the transparent material is irradiated with pulsed laser beam with a pulse duration equal to or greater than 10 femtoseconds ($10 \times 10^{-15}$ second) but less than or equal to 10 picoseconds ($10 \times 10^{-12}$ second), the transmittance T of the transparent material to pulsed laser beam from the surface of incidence of the pulsed laser beam to the area in which the pulsed laser beam is focused satisfy the following equations (a) and (b) in relation to the focusing power M:

$$T \geq 100/M^2 \quad (a)$$

$$T \geq (I_{th} \times 2 \times 10^{-4})/(I_0 \times M^2) \quad (b)$$

M: $(\pi/4)^{1/2}$×(diameter of pulsed laser beam upon incidence on transparent material)/(cube root of the focused volume in the material);

$I_{th}$: Spatial power density (W/cm³) of the pulsed laser beam necessary to form a region having a different refractive index in a volume in which a pulsed laser beam is focused in the transparent material; and $I_0$: Pulsed laser beam power density (W/cm²) at the surface of incidence of the pulsed light on the material.

In an optical component or optical low-pass filter of this invention, the transparent material may be an infrared cutoff filter, with transmittance at a thickness of 0.5 mm in the wavelength range from 400 nm to 550 nm of 50% or greater, and with transmittance from 800 nm to 1000 nm of 30% or less.

In an optical component or optical low-pass filter of this invention, it is preferable that the α ray dose emitted from the transparent material be 0.02 count/cm²·hr or less.

In an optical component or optical low-pass filter of this invention, it is preferable that the β ray dose emitted from the transparent material be 100 count/cm²·hr or less.

In an optical component or optical low-pass filter of this invention, the transparent material may be a refractive index-distributed type optical component.

In an optical component or optical low-pass filter of this invention, either a portion of the surface, or the entire surface, may have a convex portion and/or a concave portion.

An image capture optical system of this invention has an optical component or optical low-pass filter with any of the above-described configurations.

In an image capture optical system of this invention, it is preferable that in the high spatial frequency region equal to or greater than the cutoff frequency, the MTF value≦0.5.

In a method of manufacture of an optical component or low-pass filter of this invention, in order to manufacture an optical component or optical low-pass filter with any of the above-described configurations, transparent material is irradiated with pulsed laser beam or focused light, to form regions with different refractive indexes in the interior.

In a manufacturing method of this invention, it is preferable that the irradiated pulsed laser beam have a pulse duration of 10 femtoseconds ($10 \times 10^{-15}$ second) or greater but 10 picoseconds ($10 \times 10^{-12}$ second) or less.

In a manufacturing method of this invention, it is preferable that the irradiated pulsed laser beam have a spatial power density, at the position of focusing in the interior of the transparent material, of from $0.2 \times 10^{11}$ to $0.9 \times 10^{24}$ W/cm³.

A manufacturing method of this invention may have a process of dividing the irradiated pulsed laser beam into a plurality of beams.

In a manufacturing method of this invention, a plurality of pulsed laser beams may be focused on and irradiate the transparent material at a plurality of positions, to form, all at once, a plurality of regions with different refractive indexes.

In a manufacturing method of this invention, a plurality of pulsed laser beams may be made to interfere in the interior of the transparent material, to form, in the interior, regions with different refractive indexes, the shapes of which depend on the optical intensity distribution of the pulsed laser beam formed by the interference.

In a manufacturing method of this invention, the shapes of regions with different refractive indexes, formed in the interior, may be changed periodically within the continuous regions.

In a manufacturing method of this invention, regions with different refractive indexes, formed in the interior, may be arranged periodically in two dimensions or in three dimensions.

In a manufacturing method of this invention, it is preferable that the shapes of regions with different refractive indexes formed in the interior be changed periodically within the continuous regions, and that the periodic changes in shape be periodic changes in shape such that, in the high spatial frequency region equal to or greater than the cutoff frequency, the MTF value $\leq 0.5$.

In a manufacturing method of this invention, it is preferable that the regions with different refractive indexes formed in the interior be arranged periodically in two or in three dimensions, and that the regions be arranged such that, in the high spatial frequency region equal to or greater than the cutoff frequency, the MTF value $\leq 0.5$.

In a manufacturing method of this invention, it is preferable that the refractive indexes, in the wavelength range from 0.1 μm to 2 μm, in regions with different refractive indexes formed in the interior, be different by 0.0001 or more compared with the refractive index of the transparent material prior to the pulsed laser beam irradiation or focused light irradiation.

In a manufacturing method of this invention, it is preferable that the transmittance T of the transparent material to pulsed laser beam from the surface of incidence of the pulsed laser beam to the area in which the pulsed laser beam is focused satisfy the following equations (a) and (b) in relation to the focusing power M:

$$T \geq 100/M^2 \quad \quad (a)$$

$$T \geq (I_{th} \times 2 \times 10^{-4})/(I_0 \times M^2) \quad \quad (b)$$

M: $(\pi/4)^{1/2} \times$(diameter of pulsed laser beam upon incidence on transparent material)/(cube root of the focused volume in the material);

$I_{th}$: Spatial power density (W/cm$^3$) of the pulsed laser beam necessary to form a region having a different refractive index in a volume in which a pulsed laser beam is focused in the transparent material; and $I_0$: Pulsed laser beam power density (W/cm$^2$) at the surface of incidence of the pulsed light on the material.

The configuration of an optical component or optical low-pass filter of this invention is explained below.

By discontinuously forming, in a transparent material having refractive index $n_0$, a region of refractive index N differing from $n_0$, an optical component or optical low-pass filter is configured. From the standpoint of efficiency in the manufacturing processes, irradiation with laser light of as small a region as possible results in greater efficiency. It is preferable that the region with refractive index $n_0$ have the greatest volume in the optical component or optical low-pass filter.

This optical component or optical low-pass filter utilizes the fact that a change in phase occurs between the light passing through the region of refractive index N and the light passing through the region of refractive index $n_0$, or the fact that, due to a change in the optical path caused by a change in the shape of the region with refractive index N, a change occurs in the phase relative to transmitted light.

Further, this invention utilizes the fact that, by causing a periodic change in the shape of the continuous region with refractive index N, or by periodically forming, and arranging in two dimensions or in three dimensions, a plurality of regions with refractive index N in the interior of the transparent material, an optical component or an optical low-pass filter is configured.

It is preferable that these periodic changes in shape, or this periodic arrangement, be periodic changes in shape or a periodic arrangement such that incident light is separated into beams, and that in a high spatial frequency region equal to or above the cutoff frequency $r_c$ determined by sampling theory for a solid-state image capture element or similar, the MTF value is 0.5 or less (where the MTF value for which the spatial frequency is 0 (lines/mm) is 1). It is still more preferable that the MTF value be 0.3 or less, and most preferable that the MTF value be 0.1 or less.

The periodicity with which regions with this refractive index N are arranged may be a fixed period in two dimensions or in three dimensions, or the period may be modulated.

It is preferable that the MTF value be within the above ranges for light of wavelengths from 400 nm to 700 nm.

As the beam separation, in an optical system in which an optical image 21 is focused on the pixel plane of a solid-state image capture element 24 via a lens optical system 22 and the optical component 23 of this invention, as shown in FIG. 19, when for example considering pixels of pixel size x' arranged in one direction as shown in FIG. 20, beams may be separated in three directions such that the intervals between the 0th order light 25 and the 1st order light 26 and/or −1st order light 27 are equal. The intensities of these separated light beams, that is, the intensity $I_0$ of the 0th beam and the intensities $I_{\pm 1}$ ($I_1$, $I_{-1}$) of the ±1th order beams, may have relative intensities ($R=I_{\pm 1}/I_0$) in the range $0.5<R<2$. The method of beam separation is not limited to this, and depending on the method of arrangement of pixels and visual preferences, still higher orders of separated beams may be used, and the relative intensities thereof may be selected as appropriate.

It is preferable that these periodic changes in shape, or this periodic arrangement, be periodic changes in shape or a periodic arrangement such that, when the optical component or optical low-pass filter of this invention is combined with the optical system containing other optical components which function in a related manner, the MTF value equal to or greater than the $r_c$ of the low-pass filter is within the above-described range. Optical components contained within the optical system combined with an optical component or optical low-pass filter of this invention may be, for example, lenses, mirrors, prisms, reflection-preventing components, dichroic components, polarizing components, phase plates, apertures, color filters, and similar; but such components are not limited to these examples.

Further, the above-described periodic structure itself may act as a lens, and may be a periodic structure such that the MTF is within the above range.

The shape of a region with refractive index N may be any arbitrary shape. For example, the shape may be cylindrical, a triangular, quadrangular or other prism shape, spherical, ellipsoidal, cubic, a rectangular parallelepiped, a cone, a triangular, quadrangular, or other pyramid, or may be some other polyhedron. Further, the shape of the region of refractive index N may be such that the shape changes periodically within the continuous region. When a plurality of regions of refractive index N are formed and arranged, each of the shapes of the arranged regions may be made uniform, or the thicknesses and sizes of the regions may be changed periodically, or may be changed randomly.

The transparent material of this invention is material such that the transmittance T to the pulsed laser beam, from the surface of incidence of the pulsed laser beam irradiated in order to form the regions of refractive index N to the area of focusing of the pulsed laser beam, in relation to the focusing power M, satisfies the following equations (a) and (b):

$$T \geq 100/M^2 \quad \quad (a)$$

$$T \geq (I_{th} \times 2 \times 10^{-4})/(I_0 \times M^2) \quad \quad (b)$$

M: $(\pi/4)^{1/2} \times$(diameter of pulsed laser beam upon incidence on material)/(cube root of the focused volume in the material);

$I_{th}$: Spatial power density (W/cm$^3$) of the pulsed laser beam necessary to form a region having a different refractive index in a volume in which a pulsed laser beam is focused in the material; and $I_0$: Pulsed laser beam power density (W/cm$^2$) at the surface of incidence of the pulsed light on the material.

In the process of forming regions of refractive index N, it is preferable that the linear D absorption coefficient of the material with respect to the wavelength of the irradiated laser light be small. Specifically, it is preferable that the above equations (a) and (b) be satisfied. Moreover, it is more preferable still that in place of the above equation (b), the following equation (c) be satisfied, and it is most preferable that in place of the equation (c), the following equation (d) be satisfied:

$$T \geq (I_{th} \times 3 \times 10^{-4})/(I_0 \times M^2) \quad (c)$$

$$T \geq (I_{th} \times 5 \times 10^{-4})/(I_0 \times M^2) \quad (d).$$

Within the above range, damage to regions other than the focused area can be made small, and good-precision fabrication is possible.

The above linear absorption coefficient is the absorption coefficient when the laser beam power density (laser power/irradiated area) is low.

It is preferable that the transparent material of this invention be a single crystal, glass, glass ceramics, ceramics, or an organic resin. The shape of the material need not be bulk, but may be a thin film on bulk substrate. Moreover, the shape of the material is not limited to a parallel plate, but may for example have concave or convex curved surfaces, such as in the case of a lens, or higher-order curved surfaces.

The transparent material of this invention may itself have certain characteristics. For example, an infrared light cutoff filter to eliminate infrared rays, and cover glass to protect solid-state image capture elements, are provided on the front surface of CCDs and other solid-state image capture elements. The transparent material of this invention may be material having the functions of such an infrared light cutoff filter and/or cover glass. It is preferable that such an infrared light cutoff filter have a transmittance, at a thickness of 0.5 mm, of 50% or higher in the wavelength range from 400 nm to 550 nm, and that the transmittance in the wavelength range from 800 nm to 1000 nm be 30% or lower; it is still more preferable that the transmittance be 50% or higher in the wavelength range from 400 nm to 550 nm, and 10% or lower in the wavelength range from 800 nm to 1000 nm; and it is most preferable that the transmittance be 50% or higher in the wavelength range from 400 nm to 550 nm, and be 5% or lower in the wavelength range from 800 nm to 1000 nm.

If the α ray dose emitted from the cover glass itself positioned in front of a CCD or other solid-state image capture element is high, this radiation may become a source of noise, and so it is preferable that the α ray emission amount be low; it is preferable that the dose be 0.02 count/cm$^2$·hr or less, and still more preferable that the dose be 0.01 count/cm$^2$·hr or less. Similarly, β ray emission may be a source of noise, and so it is preferable that the β ray dose be 100 count/cm$^2$·hr or less, and still more preferable that the dose be 50 count/cm$^2$·hr or less.

With respect to the transparent material of the invention, because each of the transition metal components Ti, V, Cr, Mn, Fe, Co, Ni, Cu, Ag, Mo, and similar, either singly or in combination, causes coloration of the material itself when contained in even small amounts, causing absorption at specific wavelengths in the visible range, when using an optical component of this invention in the visible wavelength range, it is preferable that such components effectively not be contained in the transparent material. Moreover, each of the rare earth components also may cause coloration, when contained either singly or in combination, and tend to cause absorption at specific wavelengths in the visible range; hence when using an optical component of this invention in the visible wavelength range, it is often preferable that such components effectively not be contained in the transparent material.

Further, in recent years there has been a tendency to reduce use of each of the components Be, Pb, Th, Cd, Tl, As, Os, S, Se, Te, Bi, F, Br, Cl, I and similar as harmful chemical substances, and various related environmental measures have been taken, in glass production processes, fabrication processes, treatment after production and similar; hence when emphasizing environmental impact, it is preferable that such components effectively not be contained in the transparent material.

However, when using a material having a color filtering function, and in particular a material having an infrared light cutoff filter function, as the transparent material of the invention, it is often preferable that a Cu, Ni, V, Fe, Ce, Pb, Sn, or other component be contained in the transparent material of the invention.

Conventional optical low-pass filters are obtained by forming portions with different refractive indexes, or patterns of convex, concave and similar, on the surface of a substrate. In this invention, by forming portions with a refractive index N in the interior, these can be arranged in three dimensions, so that through conventional fabrication of the material surface, there is greater degree of freedom of pattern formation compared with low-pass filters obtained by conventional material surface fabrication.

Here the refractive indexes $n_0$ and N represent refractive indexes at an arbitrary wavelength between 0.1 µm and 2 µm; in order to cause a phase difference between transmitted light beams, it is preferable that $n_0$ and N be different by 0.0001 or more, still more preferable that the difference be 0.001 or more, and most preferable that the difference be 0.01 or more.

In a plurality of regions in a single filter, N may have not a single value, but a plurality of values. Moreover, within a single continuous region, N may have a plurality of values, or may change continuously.

A method of manufacture of an optical component or optical low-pass filter of this invention is explained below.

Through pulsed laser beam irradiation or focused light irradiation on the interior of a transparent material of this invention, a heterogeneous phase is formed in the interior of the material, and by means of a permanent change in the refractive index of this heterogeneous phase from the state prior to laser light irradiation, a region with different refractive index is formed, to effect the optical component.

In this invention, "heterogeneous phase" refers broadly to heterogeneous phases formed through light-induced changes caused by laser light irradiation. Light-induced changes include, for example, crystal generation and/or crystal growth, increases or decreases in density, phase separation, void formation and similar due to nonlinear effects, and various other effects resulting from changes in molecular structure within the material due to the intense electromagnetic fields of the light, heating, chemical reactions, oxidation or reduction of material due to focusing of laser light, nonlinear effects, or various other effects of light; in this invention, permanent refractive index changes arising from these are utilized.

When strain occurs in the material interior after laser light irradiation, or when coloration occurs, it is preferable that heat treatment be performed within an appropriate temperature range such that the material does not soften, to alleviate or remove this strain or coloration.

It is preferable that the irradiated pulsed laser beam have a pulse duration of 10 femtoseconds ($10\times10^{-15}$ second) or greater but 10 picoseconds ($10\times10^{12}$ second) or less; in particular, it is still more preferable, in the case of glass, that the pulse duration be 15 femtoseconds or greater but 500 femtoseconds or less, and most preferable that the pulse duration be 20 femtoseconds or greater but 300 femtoseconds or less.

When irradiating the material interior with laser light, because of the problem of spatial distribution of the focus point in the material interior, and in particular the spatial distribution of the focus shape having a three-dimensional shape, it is preferable that the irradiated laser light be regulated using the concept of spatial power density. Spatial power density is defined as follows.

Spatial power density (W/cm$^3$)=energy (J) input into a specific infinitesimal volume÷irradiation time (s)÷the infinitesimal volume (cm$^3$)

In this invention, it is preferable that the laser power when forming a refractive index modified region result in a spatial power density, at the position of focusing in the material interior, of from $0.2\times10^{11}$ to $0.9\times10^{24}$ W/cm$^3$; in particular, it is still more preferable that the spatial power density be from $0.2\times10^{15}$ to $0.9\times10^{20}$ W/cm$^3$, and most preferable that the spatial power density be from $0.5\times10^{15}$ to $0.5\times10^{20}$ W/cm$^3$.

When the material is irradiated with a plurality of pulses, the material interior may be irradiated with these pulses or focused light pulses so as to cause interference, to form refractive index modified regions of a shape corresponding to the optical intensity distribution formed as a result of the interference. In this case, it is preferable that the spatial power density in the region with the highest optical intensity in the interference pattern be within the above-described range. It is also preferable that the laser pulse duration be within 100 femtoseconds to 10 picoseconds, more preferable still that the pulse duration be between 300 femtoseconds and 1 picosecond, and most preferable that the pulse duration be between 400 femtoseconds and 900 femtoseconds. When in the above ranges, precise fabrication is possible at the positions of interference in the interior of the material, without causing damage to the surface.

A method of manufacture of an optical component of this invention may have a process of splitting the pulsed laser beam into a plurality of beams, and, by focused irradiation of a plurality of positions by these plurality of pulsed laser beams, enabling the formation, all at once, of a plurality of regions with different refractive indexes in the material interior, so that the fabrication throughput can be improved. In the process of dividing the beam into a plurality of beams, a beam splitter, diffraction grating, microlens array, or other optical component can be used; but the means used is not limited to these.

Moreover, the method may have a process of changing one or more than one among the pulse phase, amplitude, wavelength, polarization, or pulse time width of one or a plurality of divided pulsed laser beams; and by appropriately combining these changed pulsed laser beams, fabrication is possible with a high degree of freedom not dependent on the refractive index, refractive index distribution, or shape of the material irradiated.

In order to form over a still broader range the refractive index changed regions formed all at once in desired positions within the transparent material, the focus points of the focused pulsed laser beam can be moved relative to the material.

An optical component or low-pass filter of this invention utilizes refractive index modified regions formed in the interior of the material by pulsed laser beam irradiation, and that refractive index modified regions may have the action of improving the bending strength or other mechanical properties.

An optical component or low-pass filter of this invention utilizes refractive index modified regions formed in the interior of the material by pulsed laser beam irradiation, and it is preferable that the material shape at the time of laser light irradiation be such that the surface of incidence of the laser light is a plane; but the surface need not necessarily be a plane, and may for example be a convex or concave surface with curvature, as in the case of a lens, or may be a higher-order curved surface.

Further, it is preferable that the transparent material prior to pulsed laser beam irradiation be optically isotropic; but the material may have birefringence, or the component may be an optical component of the refractivity distribution type. Such Refractivity distribution type optical components include GRIN lenses, microlens arrays, optical waveguides, and diffraction gratings, but are not limited to these examples.

An optical component or low-pass filter of this invention may be fabricated by fabrication the material interior through laser light irradiation, and then for example using post cutting or grinding processes to machine the material to a desired shape; for example, the shape may be a convex or concave curved surface, or a higher-order curved surface, or may be a structure having polygonal steps or grooves.

DETAILED DESCRIPTION OF THE INVENTION

Figure 1:
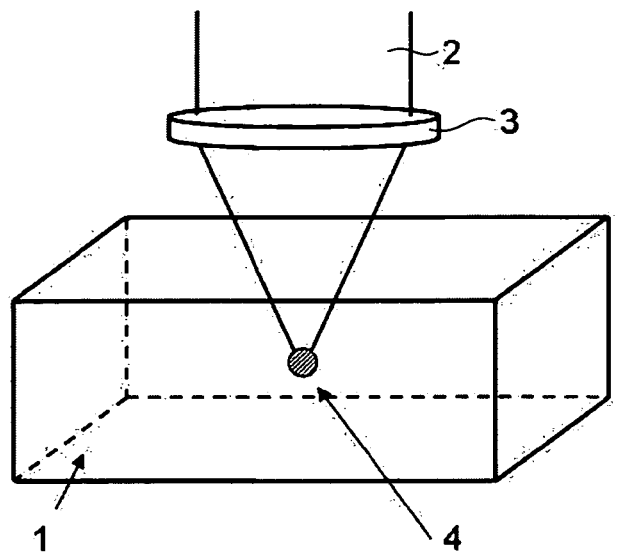
FIG. 1 is a schematic diagram showing an example of a method of forming a heterogeneous phase of refractive index N in a desired position within a transparent substrate of refractive index $n_0$ by means of this invention.

Below, embodiments of optical components and optical low-pass filters of this invention are explained, referring to the drawings.

FIG. 1 is a schematic diagram showing a method of forming a region 4 in the interior of a transparent substrate 1, with refractive index N different from the refractive index $n_0$ of the substrate, through focused irradiation of a desired position in the interior of a transparent substrate with refractive index $n_0$ with femtosecond pulsed laser beam 2 via a lens 3. By arbitrarily scanning the focal point of the laser light in the x, y, z directions relative to the substrate, and by irradiating at once a plurality of positions with laser light, or by combining these methods, a refractive index modified region of desired shape can be formed. In this invention, the refractive index N of a region formed in this way is utilized.

Figure 2:
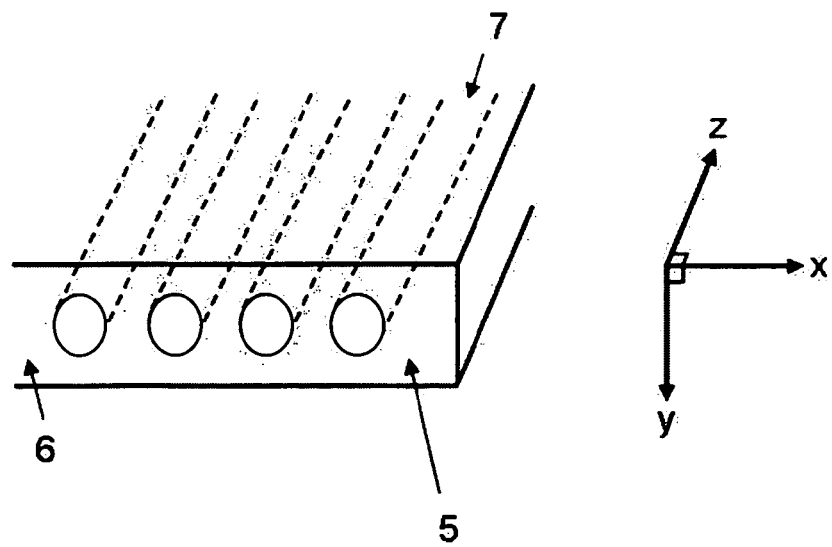
FIG. 2 is a schematic view showing an optical low-pass filter of a first embodiment of the invention.

As a first embodiment of an optical filter, FIG. 2 shows an optical low-pass filter 5. Here, in this structure regions 7 of refractive index $N(x, y)$ different from the refractive index $n_0$ of the substrate are formed in the interior 6 of the transparent substrate with refractive index $n_0$, formed using the method of FIG. 1, in stripe shapes having width a and interval p with periodicity only in the x direction in which the component is to act as the optical low-pass filter. The component this acts as an optical low-pass filter with respect to an object having a high spatial frequency component in one direction.

In this embodiment, if the cross-sectional shape of the region 7 in the x-y plane of the optical low-pass filter 5 is $y=l(x)$, then the difference $\Delta L(x)$ in the optical distances traveled by the light A traversing only the substrate with refractive index $n_0$, and the light B traversing the coordinate x, is expressed by the following equation (1):

$$\Delta L(x) = \int_{l_{in}(x)}^{l_{out}(x)} N(x, y) dy - n_0 l(x). \quad (1)$$

If the refractive index $N(x, y)$ of the region 7 is held constant and equal to $n_c$ and the shape $l(x)$ of the region 7 is varied, or if the shape $l(x)$ of the region 7 is held constant and the refractive index distribution of the region 7 is given, then the characteristic of the difference $\Delta L(x)$ in the optical distances can be decided arbitrarily as, for example, a triangular shape, a sinusoidal shape, or similar.

Figure 3:
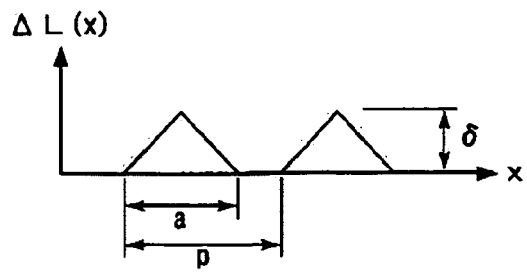
FIG. 3 is a graph showing the characteristic of the optical distance difference $\Delta L(x)$ in the optical low-pass filter of the first embodiment of the invention.
Figure 5:
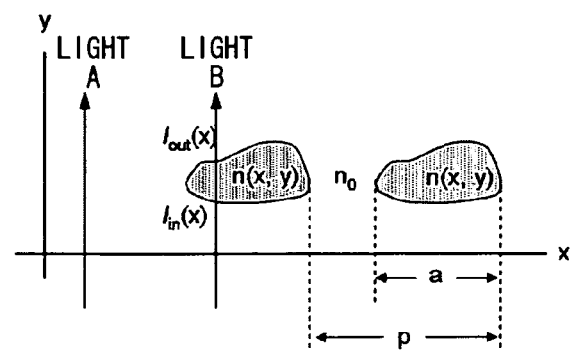
FIG. 5 is a schematic diagram showing an example of a region of refractive index N in the x-y plane of the optical low-pass filter of the first embodiment of the invention.

Hence when obtaining the characteristic of a triangle-shaped optical distance difference $\Delta L(x)$ such as shown in FIG. 3, the region 7 can for example be formed with an arbitrary cross-sectional shape $l(x)$ such as shown in FIG. 5.

Further, the $\Delta L(x)$ is set such that the MTF value is 0.5 or less in the high spatial frequency region equal to or above the cutoff frequency $r_c$, determined by the sampling theory for the image capture element with which the optical low-pass filter is used. If MTF $\leq 0.5$, then spurious signals can be suppressed sufficiently for visual tolerance. It is more preferable from the standpoint of suppressing spurious signals that MTF $\leq 0.3$, and most preferable that MTF $\leq 0.1$. Thus in order to set $\Delta L(x)$, it is sufficient to select a $\Delta L_{max}$ expressed in terms of the period length p and width a in equation (2), that is, a shape and $\Delta L = \Delta L_{max}$ at the position $x_{max}$ of greatest thickness of the heterogeneous phase;

$$\Delta L_{max} = \int_{l_{in}(x_{max})}^{l_{out}(x_{max})} N(x, y) dy - n_0 l_{max}. \quad (2)$$

Figure 4:
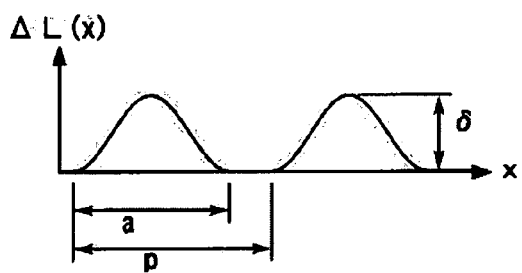
FIG. 4 is a graph showing the characteristic of the optical distance difference $\Delta L(x)$ in the optical low-pass filter of the first embodiment of the invention.
Figure 6:
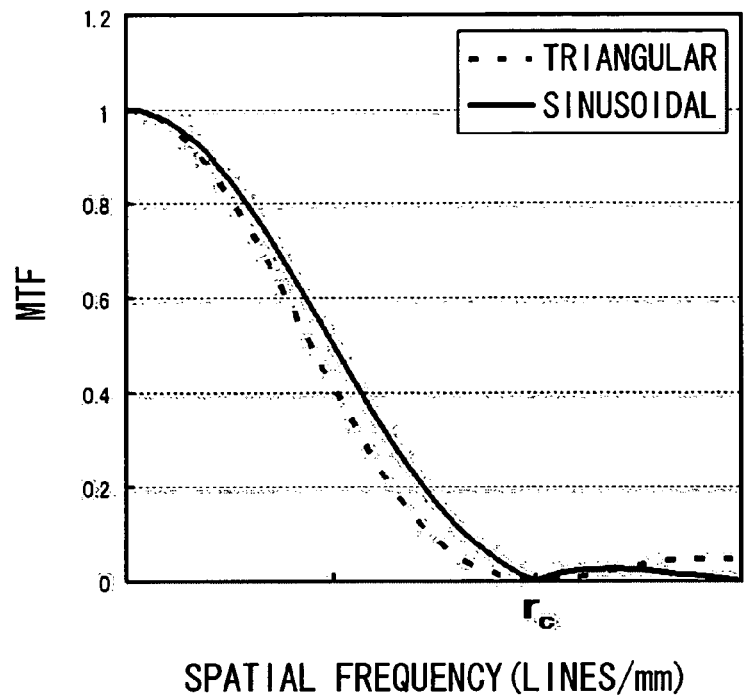
FIG. 6 is a graph showing an example of the MTF curve in the optical low-pass filter of the first embodiment of the invention.

For example, by holding $\Delta L_{max}$ in equation (2) constant and varying the shape of the region 7, and relating the width a to the period length p by a=p, to impart the triangular optical distance difference $\Delta L(x)$ characteristic shown in FIG. 3 above, the MTF characteristic represented by the broken line in FIG. 6 results. Further, when imparting the sinusoidal-shape optical distance difference $\Delta L(x)$ shown in FIG. 4, the MTF characteristic indicated by the solid line in FIG. 6 results. In FIG. 6, the lines in the horizontal-axis units (lines/mm) are the number of lines, taking one line to be a set of white and black.

Figure 7:
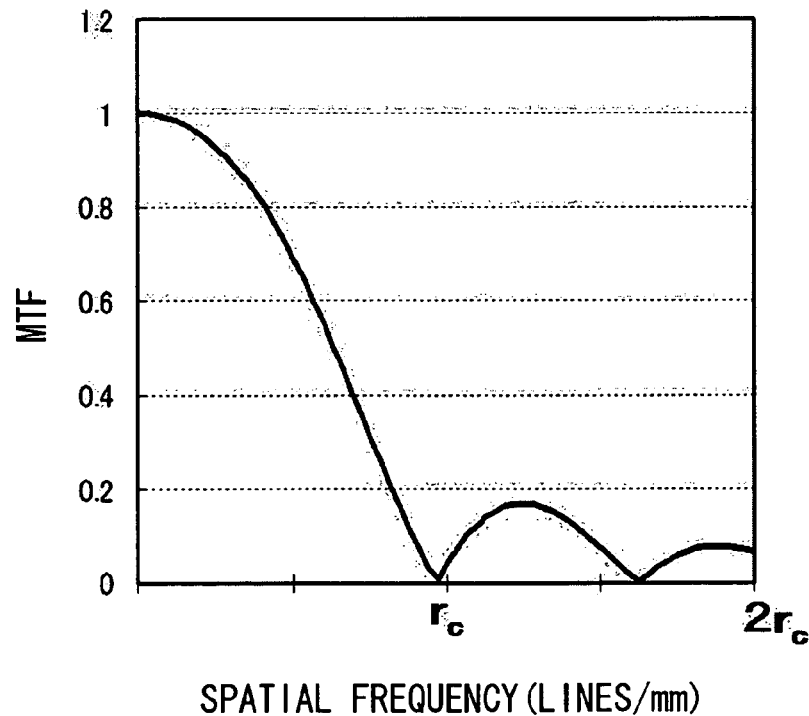
FIG. 7 is a graph showing another example of the MTF curve in the optical low-pass filter of the first embodiment of the invention.

In this embodiment, borosilicate glass with a refractive index $n_{633}$ of 1.51462 is used as the transparent material in a low-pass filter for a CCD, in which the pixel arrangement in one direction is such that pixels are of width 3 μm and the period is 6 μm; pulsed laser beam with a pulse duration of 150 femtoseconds, at wavelength 800 nm, with a repetition frequency of 250 kHz and a laser power of 100 mW, was focused to irradiate an area at a depth of 100 μm from the surface using a lens with focal length 9 cm (N.A.=0.4), and by moving the glass at a scanning speed of 100 mm/sec in relative motion, stripe-structure refractive index modified regions were fabricated, as shown in FIG. 2, with a line width of approximately 10 μm and interval between lines of approximately 12 μm. The refractive index difference measured at 633 nm was approximately 0.0018. The MTF curve at a wavelength of 633 nm for this low-pass filter appears in FIG. 7; the MTF value at the cutoff frequency $r_c$=83 (lines/mm) was 0.04, and even in the high spatial frequency region above $r_c$, MTF was 0.3 or lower. In FIG. 7, one line in the horizontal units (lines/mm) is a set of black and white.

Figure 8:
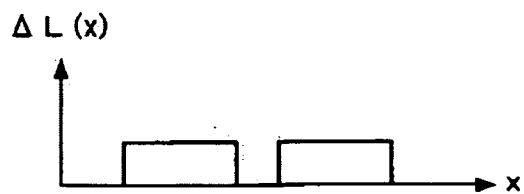
FIG. 8 is a graph showing a first example of the optical distance difference $\Delta L(x)$ characteristic in an optical low-pass filter of the invention.
Figure 9:
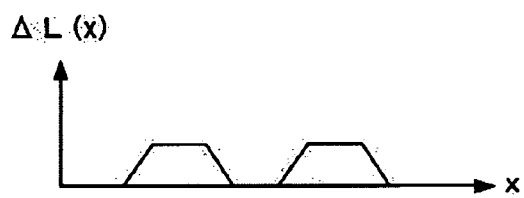
FIG. 9 is a graph showing a second example of the optical distance difference $\Delta L(x)$ characteristic in an optical low-pass filter of the invention.
Figure 10:
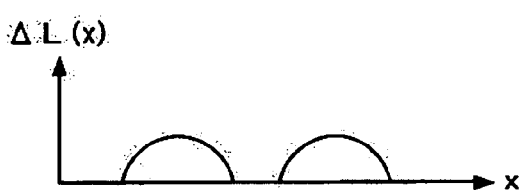
FIG. 10 is a graph showing a third example of the optical distance difference $\Delta L(x)$ characteristic in an optical low-pass filter of the invention.
Figure 11:
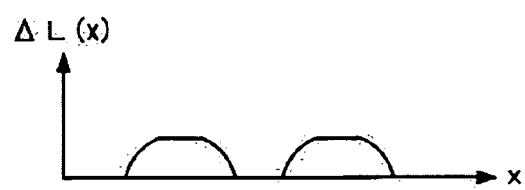
FIG. 11 is a graph showing a fourth example of the optical distance difference $\Delta L(x)$ characteristic in an optical low-pass filter of the invention.

Moreover, similar performance can be maintained when the above optical distance difference $\Delta L(x)$ characteristic is made rectangular in shape, as shown in FIG. 8, when a trapezoidal shape is used as in FIG. 9, when an arc shape is employed as shown in FIG. 10, and when the inclined edges of a trapezoid are made arcs, as in FIG. 11. It is sufficient to choose the refractive index $N(x, y)$ and shape $l(x)$ in the above equation (1) such that the desired optical distance difference $\Delta L(x)$ is obtained.

In the above embodiment, regions 7 with refractive index $N(x, y)$ are formed within a substrate with refractive index $n_0$ in stripe shapes, having periodicity in the x direction in the interior of the transparent substrate 6; but an optical low-pass filter of this invention is not limited to the above embodiment, and the periodic structure of a heterogeneous phase in the embodiment 1 may be formed at a different depth in the same substrate, so as to have a periodicity in a different direction.

Figure 12:
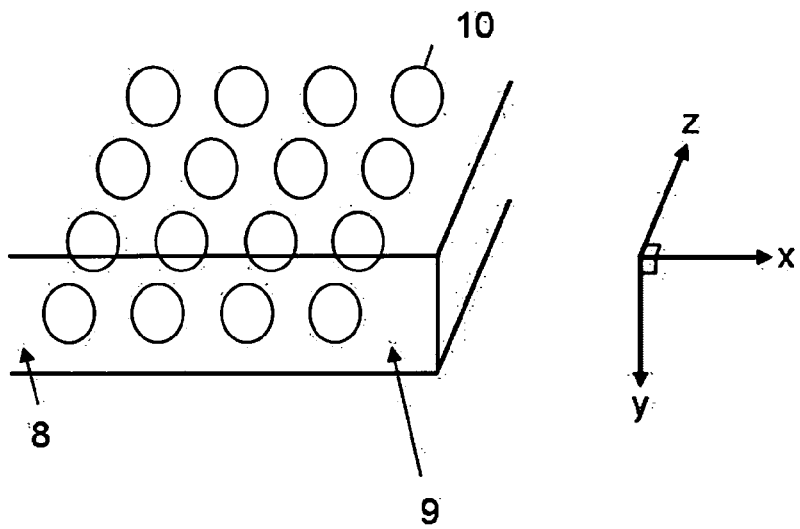
FIG. 12 is a perspective view showing the optical low-pass filter of a second embodiment of the invention.

Moreover, an optical low-pass filter 9 can be realized in which the region 10 with refractive index N(x, y, z) is formed and arranged in two dimensions to act in two or more directions, having periodicity in the interior of the substrate 8 with refractive index $n_0$, such that the refractive index N(x, y, z) or the shape l(x, y, z) also changes in the z direction in FIG. 2. FIG. 12 shows such an optical low-pass filter of a second embodiment.

The optical low-pass filter 9 of the second embodiment is such that the regions 10 with refractive index N(x, y, z) has periodicity in the x direction and in the z direction, and so has an optical distance difference ΔL(x, z) characteristic as indicated by equation (3) below, and acts as an optical low-pass filter in two or more directions of the object image:

$$\Delta L(x) = \int_{l_{in}(x)}^{l_{out}(x)} N(x, y, z) dy - n_0 l(x, z). \quad (3)$$

Figure 13:
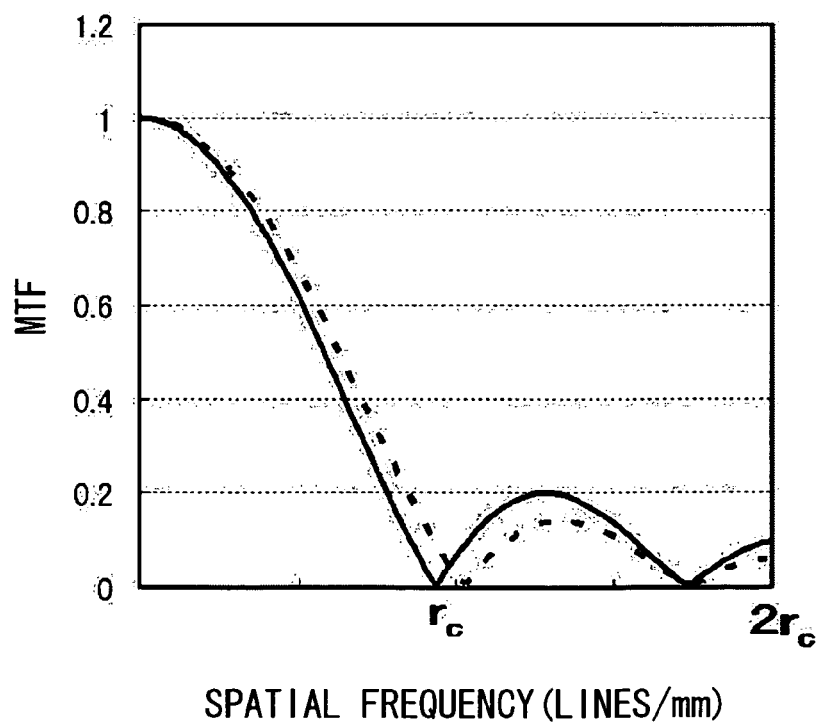
FIG. 13 is a graph showing the MTF curve of the optical low-pass filter of the second embodiment of the invention.

In this embodiment, as a low-pass filter for a CCD having a pixel arrangement in which pixels are arranged with width 3 μm at intervals of 6 μm in the vertical direction and with width 3 μm at intervals of 6 μm in the horizontal direction, borosilicate glass with refractive index $n_{633}$=1.51462 is used as the transparent material. Pulsed laser beam of pulse duration 150 femtoseconds, wavelength 800 nm, repetition frequency 1 kHz, and laser power 150 mW is then focused using a lens of focal length 9 cm (N.A.=0.4) to irradiate an area at a depth of 100 μm from the surface, and through relative motion in the glass at a scanning speed of 12 mm/sec, an optical low-pass filter is fabricated. This optical low-pass filter has the structure of a two-dimensional lattice of refractive index modified regions such as shown in FIG. 12, with spot diameters of approximately 10 to 12 μm, with intervals between centers of adjacent spots of approximately 12 μm in the vertical direction and approximately 12 μm in the horizontal direction. The refractive index difference measured at 633 nm was approximately 0.0015. The MTF curve in the vertical direction at 633 nm for this low-pass filter is represented by the broken line in FIG. 13, whereas the solid line represents the MTF curve in the horizontal direction. From FIG. 13, the MTF value for a cutoff frequency $r_c$=83 (lines/mm) in each direction was 0.02 in the vertical direction and 0.06 in the horizontal direction. In both directions, the MTF in the high spatial frequency range above $r_c$ was less than 0.3. In FIG. 13, a line in the horizontal-axis units (lines/mm) is the number of lines as sets of black and white.

The shape and positioning of heterogeneous phases of refractive index N in a substrate of refractive index $n_0$ are not limited to those described above.

Figure 14:
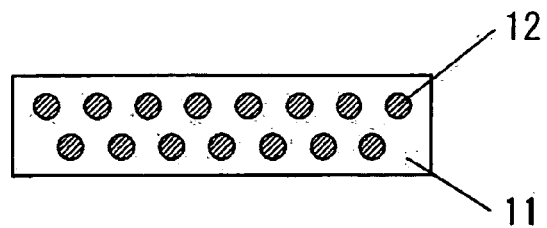
FIG. 14 is a cross-sectional view showing the optical low-pass filter of a third embodiment of the invention.

In the optical low-pass filter shown in FIG. 14, regions of a heterogeneous phase 12 of refractive index N, with circular cross-sectional shapes in the substrate 11, are arranged in a lattice.

Figure 15:
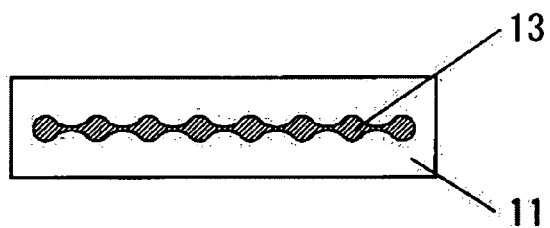
FIG. 15 is a cross-sectional view showing the optical low-pass filter of a fourth embodiment of the invention.

In the optical low-pass filter shown in FIG. 15, a region of a heterogeneous phase 13 of refractive index N, in a shape which connects a plurality of circles in cross-section, is arranged in the substrate 11.

Figure 16:
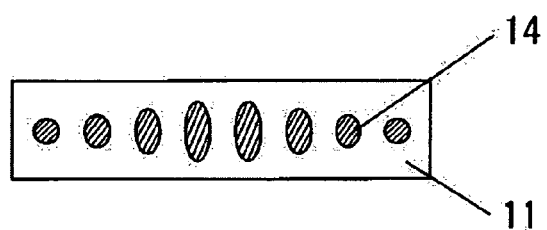
FIG. 16 is a cross-sectional view showing the optical low-pass filter of a fifth embodiment of the invention.

In the optical low-pass filter shown in FIG. 16, regions of a heterogeneous phase 14 of refractive index N, with elliptical cross-sectional shapes in the substrate 11, are arranged at substantially equal intervals in a lattice and the elliptical cross-sectional shapes are periodically changed.

Figure 17:
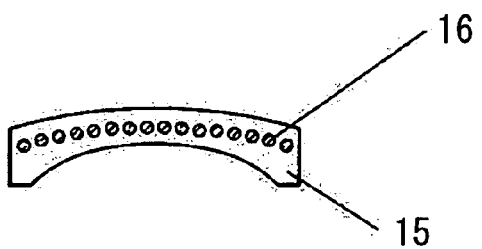
FIG. 17 is a cross-sectional view showing an example of an optical component of this invention.

In the optical component shown in FIG. 17, regions of heterogeneous phase 16 of refractive index N, with circular cross-sectional shape, are arranged at substantially equal intervals in the substrate 15, which is a lens.

Figure 18:
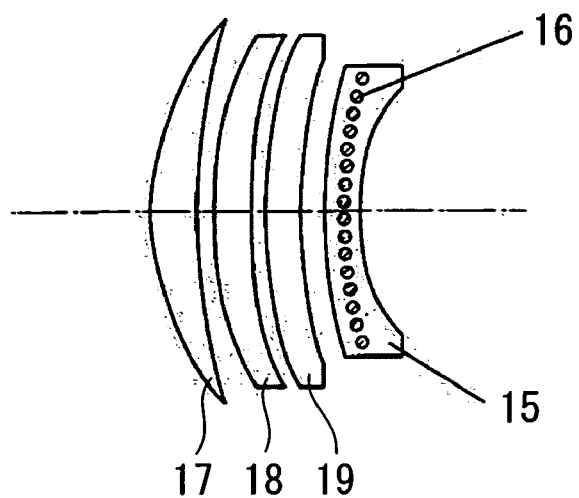
FIG. 18 is a cross-sectional view showing an example of an optical system of this invention.
Figure 19:
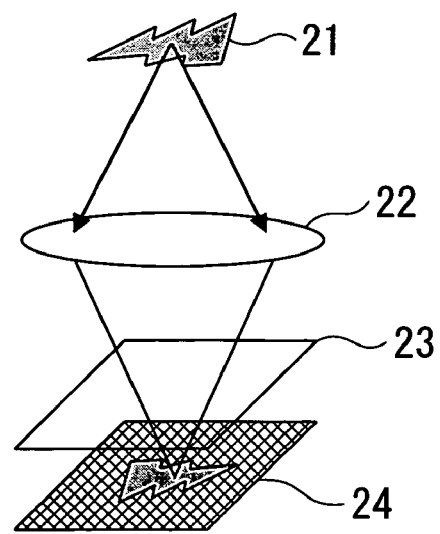
FIG. 19 is a schematic view showing an example of beam separation in this invention.
Figure 20:
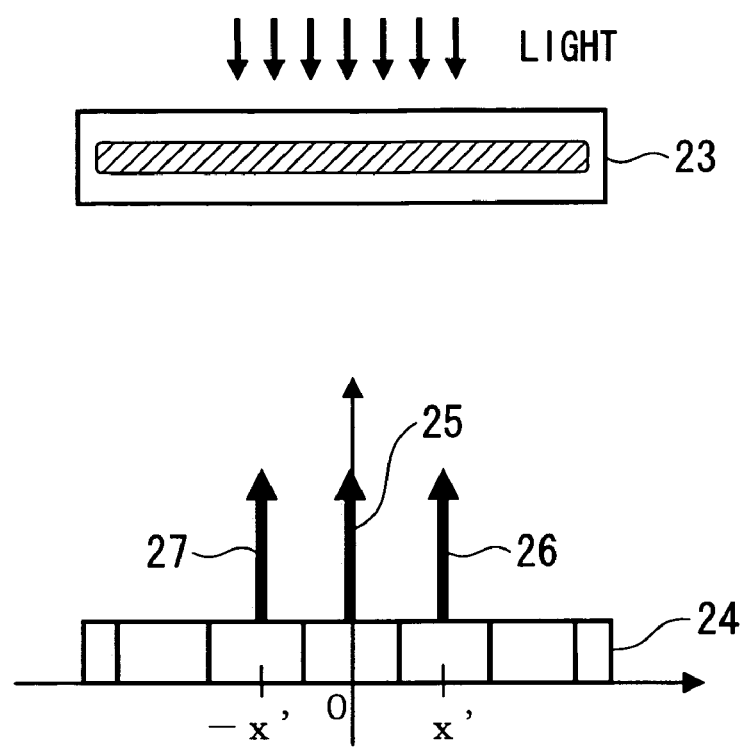
FIG. 20 is a cross-sectional view showing an example of beam separation in this invention.

Referring to FIG. 18, the optical component shown in FIG. 17 is used to configure an optical system, with lenses 17, 18, 19 positioned on the optical axis.

This invention can be employed in optical low-pass filters and other optical components for use in, for example, phase masks, polarizing filters, phase plates, phase-type diffraction gratings, diffraction lenses, solid-state image capture elements, and similar.

According to this invention, an optical low-pass filter can be provided in which heterogeneous phase regions are formed within a material having birefringence, so that a single material can be obtained the advantages of the birefringence of the material itself, and refractive index changes arising from the heterogeneous phase.

For example, by forming refractive index modified regions within a quartz or lithium niobate single-crystal sheet, conventionally used as the material of optical low-pass filters for solid-state image capture elements, and adding the advantageous result of separating beams in the same or different directions with respect to the beam separation directions due to the birefringence inherent in these materials, the thickness of a conventional single-crystal optical low-pass filter can be reduced, and the number of sheets can be lessened, so that the image capture optical system can be made more compact.

It is preferable that an optical low-pass filter of this invention be incorporated into an image capture optical system having a solid-state image capture element, to be used for the purpose of preventing the occurrence of spurious signals due to aliasing of frequency components contained in the high spatial frequency region higher than the cutoff frequency, determined by the width and pitch of pixels in the CCD, CMOS or other solid-state image capture element. In addition to use as an optical low-pass filter, by means of this invention heterogeneous-phase regions can be formed in the cover glass or infrared ray cutoff filter of a CCD, CMOS or other solid-state image capture element, to add the function of an optical low-pass filter.

In an image capture device or similar, by modifying a portion or the entirety of a conventional lens system to serve as optical components of this invention, an image capture optical system can be configured, so that the conventional optical low-pass filter can be omitted.

Further, an optical low-pass filter of this invention can be incorporated not only as the low-pass filter of a solid-state image capture element, but in for example liquid crystal, plasma, EL, or SED displays, in liquid crystal projectors, and in other dot matrix display elements, for use in preventing Moiré and spurious color signals arising due to the pitch of dots in the display element and the pitch of the color filter array.

According to this invention, a high degree of freedom of fabrication in manufacturing processes is obtained, so that optical components or optical low-pass filters requiring complex pattern design which presented serious difficulties in the prior art can be easily obtained, and the number of fabrication processes and fabrication time can be reduced, contributing to reduce manufacturing costs. Moreover, because of the high degree of freedom in choosing materials, it is possible to appropriately select a material having the optical, mechanical, and thermal characteristics required for incorporation in a solid-state image capture element, so that an optical low-pass filter having excellent characteristics of these kinds can be obtained.

Further, fabrication after incorporation of a substrate for fabrication into the front face of a solid-state image capture device is also possible, so that problems of shifting during installation can be alleviated, for improved production yields.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical component, comprising:
a plurality of regions demarcated by differences in refractive indexes, the plurality of regions including at least a first region and a second region, the second region corresponding to a continuous region with a largest volume among the plurality of regions, wherein the first region having a refractive index different from a refractive index of the continuous region is formed in an interior of transparent material,
wherein the first region has a shape which changes periodically within the continuous region.

2. The optical component according to claim 1, wherein the first region has a shape which changes periodically in the continuous region, and the periodic change in shape is a periodic change in shape such that, in the high spatial frequency region equal to or greater than the cutoff frequency, the MTF value≦0.5.

3. The optical component according to claim 2, wherein the first region has shapes which change periodically within the continuous region, and the periodic change in shape is a periodic change in shape such that, in the high spatial frequency region equal to or greater than the cutoff frequency, the MTF value≦0.5, by which means the function of an optical low-pass filter is obtained.

4. The optical component according to claim 2, wherein said periodic changes in shape separate into beams light which is incident thereon, and are periodic changes in shape such that, in the high spatial frequency region equal to or greater than the cutoff frequency, the MTF value≦0.5.

5. The optical component according to claim 1, wherein the first region formed in the interior of said transparent material had a refractive index which, at wavelengths from 0.1 μm to 2 μm, differs by 0.0001 or more from the refractive index of the second region.

6. The optical component according to claim 1, wherein said transparent material is a single crystal, glass, glass ceramics, ceramics, or organic resin.

7. An optical component according to claim 1, wherein, when said transparent material is irradiated with pulsed laser beam the pulse duration of which is equal to or greater than 10 femtoseconds ($10\times10^{-15}$ second) but less than or equal to 10 picoseconds ($10\times10^{-12}$ second), the transmittance T of the transparent material to the pulsed laser beam from the surface of incidence of the pulsed laser beam to the area in which said pulsed laser beam is focused satisfies the following equations (a) and (b) in relation to the focusing power M:

$$T \geq 100/M^2 \quad (a)$$

$$T \geq (I_{th}\times 2 \times 10^{-4})/(I_0 \times M^2) \quad (b)$$

M: $(\pi/4)^{1/2}\times$(diameter of pulsed laser beam upon incidence on transparent material)/(cube root of the focused volume in the material);

$I_{th}$: Spatial power density (W/cm$^3$) of the pulsed laser beam necessary to form a region having a different refractive index in a volume in which a pulsed laser beam is focused in the transparent material; and $I_0$: Pulsed laser beam power density (W/cm$^2$) at the surface of incidence of the pulsed light on the material.

8. The optical component according to claim 1, wherein said transparent material is an infrared ray cutoff filter whose transmittance at a thickness of 0.5 mm is 50% or greater in the wavelength range from 400 nm to 550 nm, and is 30% or lower in the wavelength range from 800 nm to 1000 nm.

9. The optical component according to claim 1, wherein said transparent material has an α ray dose emission of 0.02 count/cm$^2$·hr or less.

10. The optical component according to claim 1, wherein said transparent material has a β ray dose emission of 100 count/cm$^2$·hr or less.

11. The optical component according to claim 1, wherein said transparent material is a refractive index-distributed type optical component.

12. The optical component according to claim 1, wherein an entire surface of the optical component, or a portion thereof, has a convex portion and/or a concave portion.

13. An image capture optical system, having the optical component according to claim 1.

14. The image capture optical system according to claim 13, wherein, in the high spatial frequency region equal to or greater than the cutoff frequency, the MTF value≦0.5.

15. A method of manufacture of the optical component according to claim 1, wherein the plurality of regions with different refractive indexes are formed in the interior by irradiation of transparent material with pulsed laser beam or focused light.

16. The method of manufacture of an optical component according to claim 15, wherein the irradiated pulsed laser beam has a pulse duration of 10 femtoseconds ($10\times10^{-15}$ second) or greater but 10 picoseconds ($10\times10^{-12}$ second) or less.

17. The method of manufacture of an optical component according to claim 15, wherein the irradiated pulsed laser beam has a spatial power density, at the position of focusing in the interior of said transparent material, of from $0.2\times10^{11}$ to $0.9\times10^{24}$ W/cm$^3$.

18. The method of manufacture of an optical component according to claim 15, further having a step of dividing the irradiated pulsed laser beam into a plurality of beams.

19. The method of manufacture of an optical component according to claim 15, wherein a plurality of pulsed laser beams are focused on and irradiate said transparent material at the plurality of positions to form a plurality of regions with different refractive indexes all at once.

20. The method of manufacture of an optical component according to claim 15, wherein a plurality of pulsed laser beams are made to interfere in the interior of said transparent material to form the plurality of regions with different refractive indexes in the interior, the shapes of the plurality of regions with different refractive indexes depending on the optical intensity distribution of the pulsed laser beam formed by the interference.

21. The method of manufacture of an optical component according to claim 15, wherein the shapes of the plurality of regions with different refractive indexes formed in the interior are changed periodically within the continuous region.

22. The method of manufacture of an optical component according to claim 21, wherein the shapes of the plurality of regions with different refractive indexes formed in the interior are changed periodically within the continuous region, and the periodic changes in shape are periodic changes in shape such that, in the high spatial frequency region equal to or greater than the cutoff frequency, the MTF value≦0.5.

23. The method of manufacture of an optical component according to claim 15, wherein the plurality of regions with different refractive indexes formed in the interior are arranged periodically in two dimensions or in three dimensions.

24. The method of manufacture of an optical component according to claim 23, wherein the plurality of regions with different refractive indexes formed in the interior are arranged periodically in two or in three dimensions, and the periodic arrangement is such that, in the high spatial frequency region equal to or greater than the cutoff frequency, the MTF value≦0.5.

25. The method of manufacture of an optical component according to claim 15, wherein the refractive indexes, in the wavelength range from 0.1 μm to 2 μm in the plurality of regions with different refractive indexes formed in the interior, are different by 0.0001 or more compared with the refractive index of the transparent material prior to the pulsed laser beam irradiation or focused light irradiation.

26. The method of manufacture of an optical component according to claim 15, wherein the transmittance T of said transparent material to said pulsed laser beam from the surface of incidence of said pulsed laser beam to the area in which said pulsed laser beam is focused satisfies the following equations (a) and (b) in relation to the focusing power M:

$$T \geq 100/M^2 \quad (a)$$

$$T \geq (I_{th} \times 2 \times 10^{-4})/(I_0 \times M^2) \quad (b)$$

M: $(\pi/4)^{1/2}$×(diameter of pulsed laser beam upon incidence on transparent material)/(cube root of the focused volume in the material);

$I_{th}$: Spatial power density (W/cm$^3$) of the pulsed laser beam necessary to form a region having a different refractive index in a volume in which a pulsed laser beam is focused in the transparent material; and $I_0$: Pulsed laser beam power density (W/cm$^2$) at the surface of incidence of the pulsed light on the material.

27. An optical component, comprising:
a plurality of regions demarcated by differences in refractive indexes, the plurality of regions including at least a first region and a second region, the second region corresponding to a continuous region with a largest volume among the plurality of regions, wherein the first region having a refractive index different from a refractive index of the continuous region is formed in an interior of transparent material, wherein the plurality of regions other than the second region are formed discontinuously, and the plurality of regions formed are arranged periodically in two dimensions or in three dimensions, wherein the plurality of regions are formed discontinuously, the plurality of formed regions are arranged periodically in two dimensions or in three dimensions, and the periodic arrangement is a periodic arrangement such that, in the high spatial frequency region equal to or greater than the cutoff frequency, the MTF value≦0.5.

28. The optical component according to claim 27, wherein the plurality of regions are formed discontinuously, the plurality of formed regions are arranged periodically in two dimensions or in three dimensions, and the periodic arrangement is a periodic arrangement such that, in the high spatial frequency region equal to or greater than the cutoff frequency, the MTF value≦0.5, by which means the function of an optical low-pass filter is obtained.

29. The optical component according to claim 27, wherein said periodic arrangement separates into beams light which is incident thereon, and is a periodic arrangement such that, in the high spatial frequency region equal to or greater than the cutoff frequency, the MTF value ≦0.5.

30. The optical component according to claim 27, wherein the first region formed in the interior of said transparent material had a refractive index which, at wavelengths from 0.1 μm to 2 μm, differs by 0.0001 or more from the refractive index of the second region.

31. The optical component according to claim 27, wherein said transparent material is a single crystal, glass, glass ceramics, ceramics, or organic resin.

32. An optical component according to claim 27, wherein, when said transparent material is irradiated with pulsed laser beam the pulse duration of which is equal to or greater than 10 femtoseconds (10×10$^{-15}$ second) but less than or equal to 10 picoseconds (10×10$^{-12}$ second), the transmittance T of the transparent material to the pulsed laser beam from the surface of incidence of the pulsed laser beam to the area in which said pulsed laser beam is focused satisfies the following equations (a) and (b) in relation to the focusing power M:

$$T \geq 100/M^2 \quad (a)$$

$$T \geq (I_{th} \times 2 \times 10^{-4})/(I_0 M^2) \quad (b)$$

M: $(\pi/4)^{1/2}$×(diameter of pulsed laser beam upon incidence on transparent material)/(cube root of the focused volume in the material);

$I_{th}$: Spatial power density (W/cm$^3$) of the pulsed laser beam necessary to form a region having a different refractive index in a volume in which a pulsed laser beam is focused in the transparent material; and $I_0$: Pulsed laser beam power density (W/cm$^2$) at the surface of incidence of the pulsed light on the material.

33. The optical component according to claim 27, wherein said transparent material is an infrared ray cutoff filter whose transmittance at a thickness of 0.5 mm is 50% or greater in the wavelength range from 400 nm to 550 nm, and is 30% or lower in the wavelength range from 800 nm to 1000 nm.

34. The optical component according to claim 27, wherein said transparent material has an α ray dose emission of 0.02 count/cm$^2$·hr or less.

35. The optical component according to claim 27, wherein said transparent material has a β ray dose emission of 100 count/cm$^2$·hr or less.

36. The optical component according to claim 27, wherein said transparent material is a refractive index-distributed type optical component.

37. The optical component according to claim 27, wherein an entire surface of the optical component, or a portion thereof, has a convex portion and/or a concave portion.

38. An image capture optical system, having the optical component according to claim 27.

39. The image capture optical system according to claim 38, wherein, in the high spatial frequency region equal to or greater than the cutoff frequency, the MTF value≦0.5.

40. A method of manufacture of the optical component according to claim 27, wherein the plurality of regions with different refractive indexes are formed in the interior by irradiation of transparent material with pulsed laser beam or focused light.

41. The method of manufacture of an optical component according to claim 40, wherein the irradiated pulsed laser beam has a pulse duration of 10 femtoseconds (10×10$^{-15}$ second) or greater but 10 picoseconds (10×10$^{-12}$ second) or less.

42. The method of manufacture of an optical component according to claim 40, wherein the irradiated pulsed laser beam has a spatial power density, at the position of focusing in the interior of said transparent material, of from $0.2 \times 10^{11}$ to $0.9 \times 10^{24}$ W/cm$^3$.

43. The method of manufacture of an optical component according to claim 40, further having a step of dividing the irradiated pulsed laser beam into a plurality of beams.

44. The method of manufacture of an optical component according to claim 40, wherein a plurality of pulsed laser beams are focused on and irradiate said transparent material at the plurality of positions to form a plurality of regions with different refractive indexes all at once.

45. The method of manufacture of an optical component according to claim 40, wherein a plurality of pulsed laser beams are made to interfere in the interior of said transparent material to form the plurality of regions with different refractive indexes in the interior, the shapes of the plurality of regions with different refractive indexes depending on the optical intensity distribution of the pulsed laser beam formed by the interference.

46. The method of manufacture of an optical component according to claim 40, wherein the shapes of the plurality of regions with different refractive indexes formed in the interior are changed periodically within the continuous region.

47. The method of manufacture of an optical component according to claim 46, wherein the shapes of the plurality of regions with different refractive indexes formed in the interior are changed periodically within the continuous region, and the periodic changes in shape are periodic changes in shape such that, in the high spatial frequency region equal to or greater than the cutoff frequency, the MTF value$\leq 0.5$.

48. The method of manufacture of an optical component according to claim 40, wherein the plurality of regions with different refractive indexes formed in the interior are arranged periodically in two dimensions or in three dimensions.

49. The method of manufacture of an optical component according to claim 48, wherein the plurality of regions with different refractive indexes formed in the interior are arranged periodically in two or in three dimensions, and the periodic arrangement is such that, in the high spatial frequency region equal to or greater than the cutoff frequency, the MTF value$\leq 0.5$.

50. The method of manufacture of an optical component according to claim 40, wherein the refractive indexes, in the wavelength range from 0.1 μm to 2 μm in the plurality of regions with different refractive indexes formed in the interior, are different by 0.0001 or more compared with the refractive index of the transparent material prior to the pulsed laser beam irradiation or focused light irradiation.

51. The method of manufacture of an optical component according to claim 40, wherein the transmittance T of said transparent material to said pulsed laser beam from the surface of incidence of said pulsed laser beam to the area in which said pulsed laser beam is focused satisfies the following equations (a) and (b) in relation to the focusing power M:

$$T \geq 100/M^2 \qquad (a)$$

$$T \geq (I_{th} \times 2 \times 10^{-4})/(I_0 \times M^2) \qquad (b)$$

M: $(\pi/4)^{1/2} \times$(diameter of pulsed laser beam upon incidence on transparent material)/(cube root of the focused volume in the material);

$I_{th}$: Spatial power density (W/cm$^3$) of the pulsed laser beam necessary to form a region having a different refractive index in a volume in which a pulsed laser beam is focused in the transparent material; and $I_0$: Pulsed laser beam power density (W/cm$^2$) at the surface of incidence of the pulsed light on the material.

* * * * *